United States Patent
Fukui

(10) Patent No.: US 9,228,515 B2
(45) Date of Patent: Jan. 5, 2016

(54) CONTROLLER AND CONTROL METHOD FOR INTERNAL COMBUSTION ENGINE

(75) Inventor: Wataru Fukui, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 95 days.

(21) Appl. No.: 13/981,929

(22) PCT Filed: Jan. 31, 2012

(86) PCT No.: PCT/IB2012/000138
§ 371 (c)(1),
(2), (4) Date: Jul. 26, 2013

(87) PCT Pub. No.: WO2012/114170
PCT Pub. Date: Aug. 30, 2012

(65) Prior Publication Data
US 2013/0327037 A1    Dec. 12, 2013

(30) Foreign Application Priority Data

Feb. 24, 2011    (JP) ................. 2011-038580

(51) Int. Cl.
| | | |
|---|---|---|
| *F02D 41/02* | (2006.01) | |
| *F02B 33/44* | (2006.01) | |
| *F02D 23/00* | (2006.01) | |
| *F02D 41/00* | (2006.01) | |
| *F02D 41/14* | (2006.01) | |
| *F02D 41/24* | (2006.01) | |
| *F02B 37/00* | (2006.01) | |

(52) U.S. Cl.
CPC ........ *F02D 41/0235* (2013.01); *F02D 41/0007* (2013.01); *F02D 41/1454* (2013.01); *F02D 41/2441* (2013.01); *F02D 41/2454* (2013.01); *F02B 37/00* (2013.01); *F02D 2200/021* (2013.01); *Y02T 10/144* (2013.01)

(58) Field of Classification Search
CPC ............ F02D 41/0007; F02D 41/0235; F02D 41/1454; F02D 41/2441; F02D 41/2454; F02D 2200/021; F02B 37/00; Y02T 10/144
USPC .............................. 60/601–603, 605.1, 605.2
See application file for complete search history.

(56) References Cited

FOREIGN PATENT DOCUMENTS

| | | |
|---|---|---|
| JP | A-7-217476 | 8/1995 |
| JP | A-9-88665 | 3/1997 |
| JP | 2008-208740 | * 9/2008 |
| JP | A-2008-208740 | 9/2008 |
| JP | A-2010-163915 | 7/2010 |

OTHER PUBLICATIONS

Machine Translation JP 2008-208740 Done Jan. 10, 2014.*

* cited by examiner

*Primary Examiner* — Audrey K Bradley
*Assistant Examiner* — Dapinder Singh
(74) *Attorney, Agent, or Firm* — Oliff PLC

(57) ABSTRACT

An ECU determines whether or not an engine water temperature has exceeded a predetermined value; and actively opens and closes a wastegate valve, and calculates a shift in a learning value amount. The ECU determines whether or not the learning value shift amount is sufficiently large to surpass a predetermined value and when the determination result is Yes (when the condition is fulfilled), takes in the learning value shift. The ECU determines whether or not the engine water temperature is sufficiently low to be below a predetermined value and reflects the learning value shift in the air-fuel ratio learning value.

11 Claims, 5 Drawing Sheets

CONTROLLER AND CONTROL METHOD FOR INTERNAL COMBUSTION ENGINE

BACKGROUND OF THE INVENTION

1. Field of the Invention

The invention relates to a controller and a control method for an internal combustion engine.

2. Description of Related Art

A variety of techniques relating to air-fuel ratio learning in internal combustion engines have been disclosed. For example, Japanese Patent Application Publication No. 9-88665 (JP-A-9-88665) describes an internal combustion engine equipped with a controller that executes computational processing for air-fuel ratio learning. The air-fuel ratio learning according to the technique described in JP-A-9-88665 makes it possible to learn a spread in air-fuel ratio caused by a spread occurring during the production of intake air measuring systems such as intake air amount sensors or fuel supply systems such as injectors, or by changes in these systems with time. The results of air-fuel ratio learning are stored as a map in a predetermined storage device, and the air-fuel ratio learning map is referred to, the learning values are retrieved, and the air-fuel ratio learning correction coefficients are set by interpolation in the subsequent control routine performed in the internal combustion engine. The results of air-fuel ratio learning can be reflected in the control of the internal combustion engine by executing such a procedure.

With a configuration in which an air-fuel ratio sensor is mounted on an exhaust passage of an internal combustion engine, the air-fuel ratio of the exhaust gas can be detected with good accuracy from the output signal of the air-fuel ratio sensor, and the output signal of the air-fuel ratio sensor is used for air-fuel ratio learning. However, in the case of a supercharged internal combustion engine having a wastegate valve, the state of the exhaust gas passing through a position where the air-fuel ratio sensor is installed differs between when the wastegate valve is open and when it is closed, and this difference can adversely affect the results of air-fuel ratio learning.

SUMMARY OF THE INVENTION

The invention provides a controller and a control method for an internal combustion engine equipped with a wastegate valve that is capable of inhibiting the decrease in accuracy of air-fuel ratio learning. More specifically, the invention provides a controller and a control method for an internal combustion engine in which the effect produced on air-fuel ratio learning by the difference between the open and closed states of the air-fuel ratio sensor is taken into account when the output signals of the air-fuel ratio sensor are used for air-fuel ratio learning.

The first aspect of the invention relates to a controller for an internal combustion engine. The controller for an internal combustion engine includes: a supercharger provided in the internal combustion engine and having a wastegate valve; an air-fuel ratio sensor provided downstream of a turbine of the supercharger in an exhaust passage of the internal combustion engine; learning means for learning a learning value by performing air-fuel ratio learning in the internal combustion engine on the basis of an output of the air-fuel ratio sensor; and shift reflection means for: a) including in a result of the air-fuel ratio learning, a difference between the learning value in an open state of the wastegate valve and the learning value in a closed state of the wastegate valve, or b) including in contents of air-fuel ratio control of the internal combustion engine using the learning value, a difference between the learning value in an open state of the wastegate valve and the learning value in a closed state of the wastegate valve.

According to the abovementioned aspect, the difference in learning values occurring between the open state of the wastegate valve and the closed state of the wastegate valve is reflected in air-fuel ratio learning. As a result, the air-fuel ratio learning can be performed with good accuracy.

In the abovementioned aspect, the controller for an internal combustion engine may further include wastegate valve control means for controlling the wastegate valve to any one state from among the closed state and open state during a cold operation of the internal combustion engine. When the wastegate valve has been controlled to one of the closed state and open state during the cold operation, the shift reflection means may use a corrected learning value, which is a value obtained by including a learning value in the other one of the open state and closed state of the wastegate valve in a learning value in the one of the open state and closed state in order to control the internal combustion engine during the cold operation.

According to the abovementioned aspect, in the cold operation as a region in which hydrogen (denoted hereinbelow by $H_2$) affects the air-fuel ratio output, correction based on the $H_2$ effect can be performed.

In the abovementioned aspect, the shift reflection means may use the corrected learning value to control the internal combustion engine during the cold operation only when a value of the difference between the learning value in the open state of the wastegate valve and the learning value in the closed state of the wastegate valve is larger than a predetermined value.

According to the abovementioned aspect, a shift of the learning value can be reflected in air-fuel ratio learning only when the divergence of the learning value is large enough to warrant the necessity of taking the shift of learning value into account.

In the abovementioned aspect, a period of cold operation may be when a temperature of cooling water that cools the internal combustion engine is equal to or lower than a predetermined temperature.

According to the abovementioned aspect, the learning means may calculate the learning value by including an effect produced by hydrogen on an output of the air-fuel ratio sensor during the cold operation.

In the abovementioned aspect, the shift reflection means includes: wastegate valve control means for controlling the wastegate valve so as to change one of the open state of the wastegate valve and the closed state of the wastegate valve to the other one of the open state and closed state during operation of the internal combustion engine; acquisition means for acquiring the output of the air-fuel ratio sensor before and after the control performed by the wastegate valve control means; and calculation means for calculating, based on the output of the air-fuel ratio sensor before and after the control performed by the wastegate valve control means acquired by the acquisition means, a difference between the learning value calculated by the learning means in the open state of the wastegate valve and the learning value calculated by the learning means in the closed state of the wastegate valve.

According to the abovementioned aspect, the difference in learning value occurring between the open and closed states of the wastegate valve can be accurately calculated.

In the abovementioned aspect, the controller for an internal combustion engine according to any one of claims may further include correction means for correcting a fuel injection amount in the internal combustion engine so as to inhibit torque fluctuations in the internal combustion engine caused by a switching control when the switching control is performed to switch the wastegate valve between the open state and the closed state.

According to the abovementioned aspect, the learning value shift amount can be reflected in the air-fuel ratio learning, while suppressing torque fluctuations.

In the abovementioned aspect, the correction means may correct a fuel injection amount in the internal combustion engine so as to inhibit torque fluctuations in the internal combustion engine caused by the switching control only when a value of an intake air amount in the internal combustion engine is equal to or greater than a predetermined value.

In the abovementioned aspect, when the wastegate valve is presently in the open state, the correction means may perform control from the open state to the closed state of the wastegate valve and correct a fuel injection amount to cut the fuel according to a torque difference corresponding to the control from the open state to the closed state.

In the abovementioned aspect, when the wastegate valve is presently in the closed state, the correction means may perform control from the closed state to the open state of the wastegate valve and correct the fuel injection amount to increase the amount of fuel according to the torque difference corresponding to the control from the closed state to the open state.

The second aspect of the invention relates to a control method for an internal combustion engine. The control method for an internal combustion engine includes: learning a learning value by performing air-fuel ratio learning in the internal combustion engine; calculating a difference between the learning value of the air-fuel ratio in an open state of a wastegate valve and the learning value of the air-fuel ratio in a closed state of the wastegate valve, and a) including in a result of the air-fuel ratio learning, the difference in the learning value or b) including in contents of air-fuel ratio control of the internal combustion engine using the learning value, the difference in the learning value.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
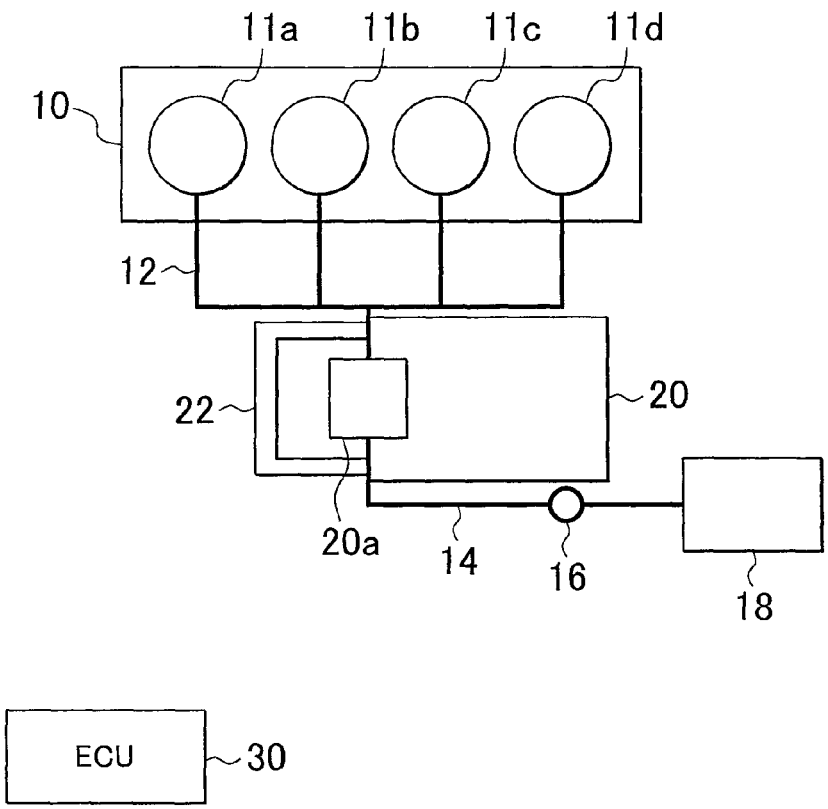
FIG. 1 illustrates the configuration of the controller for an internal combustion engine according to Embodiment 1.

FIG. 1 illustrates the configuration of the controller for an internal combustion engine according to Embodiment 1 of the invention. The internal combustion engine has an engine body 10 having four cylinders 11a, 11b, 11c, 11d. An exhaust manifold 12 is connected to the engine body 10. The engine body 10 is provided with an intake valve, an exhaust valve, a spark plug, and a fuel injection valve (not shown in the figure) for each of the cylinders. Various components of the intake system such as intake sensors, for example, an intake manifold, an intake pressure sensor, and an air flowmeter, and also a throttle valve (not shown in the figure) are connected to the engine body 10. The internal combustion engine according to Embodiment 1 that includes the engine body 10 is used as a power source for a vehicle.

The exhaust manifold 12 is connected by a turbocharger 20 to an exhaust pipe 14. The turbocharger 20 is provided with a turbine 20a. A compressor (not shown in the figure) of the turbocharger 20 is disposed at a predetermined position of the aforementioned intake system, and the compressor is driven by a rotation force of the turbine 20a generated by the exhaust gas. The turbocharger 20 is provided with a wastegate valve 22. As shown in FIG. 1, the wastegate valve 22 is a valve provided in a bypass passage provided so as to bypass the turbine 20a.

An air-fuel ratio sensor 16 is, disposed downstream of the wastegate valve 22 downstream of the turbine 20a in the exhaust pipe 14. The air-fuel ratio sensor 16 is an exhaust gas sensor that outputs a signal corresponding linearly to the air-fuel ratio of the exhaust gas. A catalyst 18 is disposed further downstream of the air-fuel ratio sensor 16 in the exhaust pipe 14.

The output signal of the air-fuel ratio sensor 16 is inputted to an ECU 30. The ECU 30 is connected to the wastegate valve 22 and performs control of switching the wastegate valve 22 between the open state and the closed state. Outputs of various sensors (in-cylinder pressure sensor, crank angle sensor, engine water temperature sensor, knock sensor, intake pressure sensor, air flow meter, throttle position sensor, accelerator position sensor relating to vehicle operation, and the like) relating to the engine body 10 are inputted to the input side of the ECU 30. Various actuators including fuel injection valves, spark plugs, and throttle motors are connected to the output side of the ECU 30. The ECU 30 realizes a predetermined program relating to control of the internal combustion engine on the basis of input information from various sensors and reflects this information in the operation of the actuators.

The ECU 30 stores a program for performing air-fuel ratio learning on the basis of the output signals of the air-fuel ratio sensor 16. According to this program, learning values as results of the air-fuel ratio learning performed in the engine body 10 are calculated on the basis of the output signals of the air-fuel ratio sensor 16 and the learning values are stored in a storage device (an random access memory (RAM)) of the ECU 30. The ECU 30 is used for various types of control of the internal combustion engine such as fuel injection amount correction in fuel injection control.

Specific contents of the air-fuel ratio control and air-fuel ratio learning according to Embodiment 1 will be explained below. The ECU 30 executes the air-fuel ratio control for adjusting the fuel injection amount such that the air-fuel ratio of the exhaust gas becomes a target air-fuel ratio. A main feedback control based on the 25 outpour signal of a pre-catalyst sensor and a sub-feedback control based on the output signal of a post-catalyst sensor are generally available as constituents of the air-fuel ratio control. The main feedback control is a processing performed to match the output signal of the pre-catalyst sensor with the target air-fuel ratio. The sub-feedback control is a processing for compensating a stationary error included in the output signal of the post-catalyst sensor. In the configuration of the internal combustion engine in Embodiment 1, the air-fuel ratio sensor 16 can correspond to the pre-catalyst sensor referred to herein.

The main feedback control will be explained below. In the main feedback control, a difference between the target and the actual air-fuel ratio of the exhaust gas measured by the air-fuel ratio sensor 16 is calculated, and a correction amount (referred to hereinbelow as "main FB correction value") that will be returned by feedback to the calculation of fuel injection amount by the proportional-integral (PI) control of the aforementioned difference is calculated. A stationary component included in the main FB correction value can be also learned as a learning value (referred to hereinbelow as "main FB learning value"). In the main feedback control, a correction coefficient of fuel injection amount is calculated by using the main FB correction value and main FB learning value, and a final fuel injection amount is calculated by multiplying the basic value of the fuel injection amount by this correction coefficient. The basic value of the fuel injection amount is calculated from the measured value of the intake air amount and the target air-fuel ratio.

The main FB learning value is learned, for example, in the following manner. When the learning is started, the main FB learning value is set to a predetermined initial value (for example, zero). After the learning has been started, a predetermined update value is added to (or subtracted from) the main FB learning value within a predetermined period. As the learning advances, the stationary component that has been included in the main FB correction value is transferred by small portions into the main FB learning value, and the center of oscillations of the main FB correction value converges to zero. The learning of the main FB learning value ends when the center of oscillations of the main FB correction value converges to zero.

Figure 2:
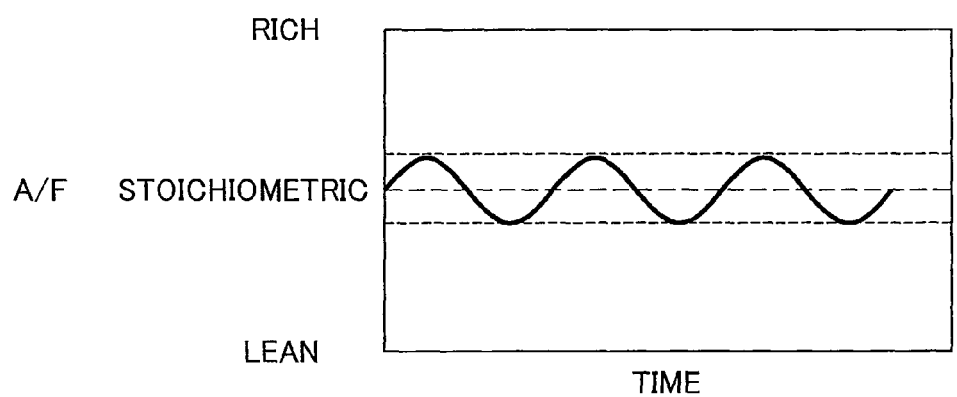
FIG. 2 is an image diagram illustrating schematically how the air-fuel ratio of the exhaust gas in the vicinity of the air-fuel ratio sensor changes in the closed state of the wastegate valve in the controller for an internal combustion engine in Embodiment 1.
Figure 3:
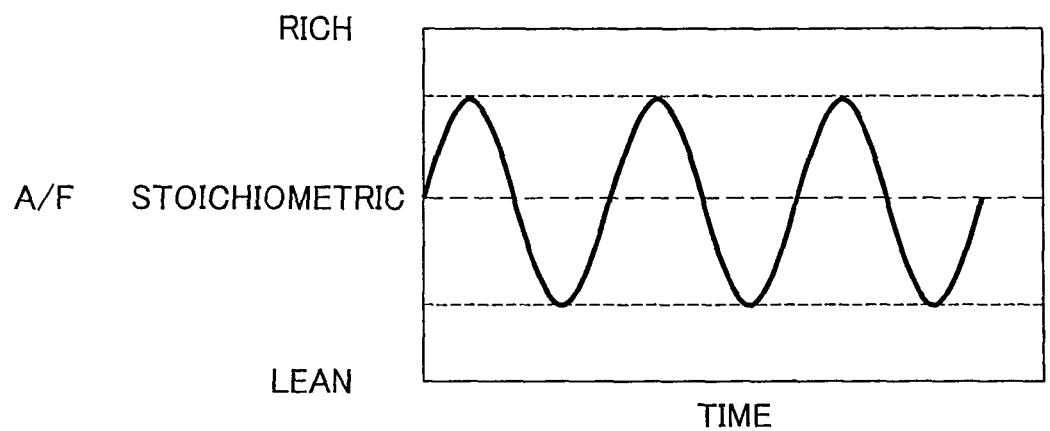
FIG. 3 is an image diagram illustrating schematically how the air-fuel ratio of the exhaust gas in the vicinity of the air-fuel ratio sensor changes in the open state of the wastegate valve in the controller for an internal combustion engine according to Embodiment 1.

FIG. 2 is an image diagram illustrating schematically how the air-fuel ratio of the exhaust gas in the vicinity of the air-fuel ratio sensor 16 changes in the closed state of the wastegate valve 22. By contrast with FIG. 2, FIG. 3 is an image diagram illustrating schematically how the air-fuel ratio of the exhaust gas in the vicinity of the air-fuel ratio sensor 16 changes in the open state of the wastegate valve 22. In the closed state of the wastegate valve 22, the entire exhaust gas collected in the exhaust manifold 12 flows through the turbine 20a. Where the exhaust gas flows through the turbine 20a, the exhaust gas is agitated by the turbine 20a, and mixing of the exhaust gas is thus advanced. Meanwhile, when the wastegate valve 22 is open, part of the exhaust gas bypasses the turbine 20a. Therefore, this bypassing exhaust gas is not mixed by the turbine 20a.

As shown in FIGS. 2 and 3, the amplitude of the waveform of air-fuel ratio fluctuations differs between the open and closed states of the wastegate valve 22, and fluctuations of air-fuel ratio (amplitude of swinging to the rich and lean sides) is smaller in the closed state of the wastegate valve 22 in which the mixing enhancement effect is produced. Since the state of the exhaust gas passing through the air-fuel ratio sensor 16 fluctuates, these fluctuations also affect the results of air-fuel ratio learning.

Figure 4:
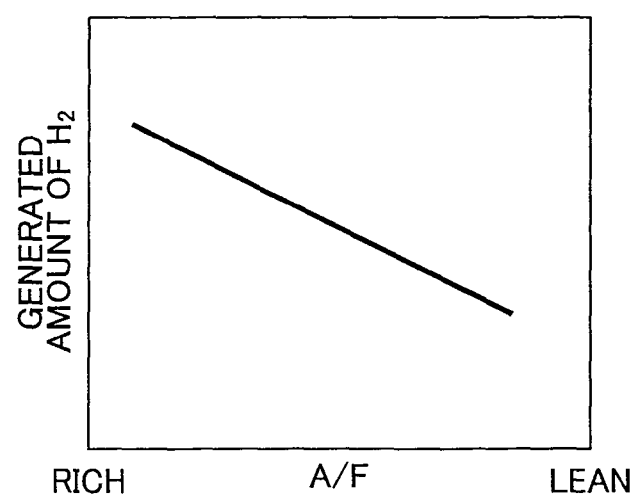
FIG. 4 illustrates schematically the correlation according to which the hydrogen generation amount increases as the air-fuel ratio becomes rich.

Accordingly, in Embodiment 1, the difference between the learning value in the open state of the wastegate valve 22 and a learning value in the closed state of the wastegate valve 22 (this difference will be referred to hereinbelow as "learning value shift amount") is reflected in air-fuel ratio learning. More specifically, the learning value shift amount can be included in the results of air-fuel ratio learning and various modes can be realized correspondingly to the specific processing contents of individual air-fuel ratio learning routines. For example, a configuration can be considered in which the results of air-fuel ratio learning are stored as a map. In this case, when the learning value in the open state of the wastegate valve 22 and the learning value in the closed state of the wastegate valve 22 are mixed in the learning value in the map, the learning value shift amount can be reflected in the results of air-fuel ratio learning by correcting the difference therebetween. For example, the learning value in one state may be taken as a reference and the learning value in the other state may be calculated, or the final learning value may be determined from the learning values in the two states. Further, the learning value shift amount may be also included in the contents of air-fuel ratio control of the internal combustion engine. More specifically, it is possible to store the learning value shift amount and include this learning value shift amount as necessary when using the learning value in the air-fuel ratio control (fuel injection amount control). Thus, by taking into account that the learning value shift amount occurs in the open and closed states of the wastegate valve 22, it is possible to prevent the accuracy of air-fuel ratio learning from decreasing when the output signal of the air-fuel ratio sensor 16 is used in air-fuel ratio learning. As a result, the degradation of emission in air-fuel ratio control using the air-fuel ratio learning result can be inhibited.

Where the effect of hydrogen (referred to hereinbelow as $H_2$) is included in the learning value when air-fuel ratio learning based on the air-fuel ratio sensor output is performed, a difference (shift) occurs between the learning values obtained when the amount of $H_2$ is large and small. As a result, the air-fuel ratio sensor center displacement (displacement of the central air-fuel ratio from the stoichiometric air-fuel ratio) caused by $H_2$ occurs. More specifically, as shown schematically in FIG. 4, the correlation is such that as the air-fuel ratio shifts to the rich side, the amount of generated hydrogen increases. The transition to the rich side is deeper in the case of large fluctuations of the air-fuel ratio such as shown in FIG. 3, and therefore, the effect of air-fuel ratio sensor center displacement by $H_2$ tends to increase. According to this tendency, as mentioned hereinabove, the air-fuel ratio fluctuations tend to increase in the open state of the wastegate valve 22 (see FIG. 3), and the degree of the effect produced by $H_2$ on the learning results differs between the open and closed states of the wastegate valve 22.

Accordingly, in Embodiment 1, the difference in learning value between the open state and closed state of the wastegate valve 22 is learned as a "$H_2$ effect". In a region in which $H_2$ affects the air-fuel ratio output (more specifically, for example, in a cold state), the correction based on the "$H_2$ effect" is performed. As a result, the air-fuel ratio control can be performed more accurately and the emission can be reduced.

When the abovementioned "$H_2$ effect" is taken into account, in Embodiment 1, either of the below-described control operation (1-1) and (1-2) is performed correspondingly to which of the "closed state" and "open state" of the wastegate valve 22 is used as a base for comparison.

(1-1) The "closed state" of the wastegate valve 22 is used as a base for comparison In this case, the learning value shift amount corresponding to the transition of the wastegate valve 22 "from the closed state to the open state" is measured during warm-up (more specifically, for example, when the engine water temperature is >70° C.). More specifically, in this measurement, a learning value is calculated by the learning processing of the ECU 30 in the closed state of the wastegate valve 22, a learning value is then calculated by the learning processing of the ECU 30 in the open state of the wastegate valve 22 after the wastegate valve 22 has been controlled to the open state, and a difference between the two learning values is calculated as a learning value shift amount. When this learning value shift amount is equal to or larger than a predetermined value (emission impact is present), the air-fuel ratio control is performed upon including this learning value shift amount during the operation (running) in the open state of the wastegate valve 22 in a cold state.

(1-2) The "open state" of the wastegate valve 22 is used as a base for comparison In this case, the learning value shift amount corresponding to the transition of the wastegate valve 22 "from the open state to the closed, state" is measured during warm-up (more specifically, for example, when the engine water temperature is >70° C.). When this learning value shift amount is equal to or larger than the predetermined value (emission impact is present), the air-fuel ratio control is performed upon including this learning value shift amount during the operation (running) in the closed state of the wastegate valve 22 in a cold state.

Figure 5:
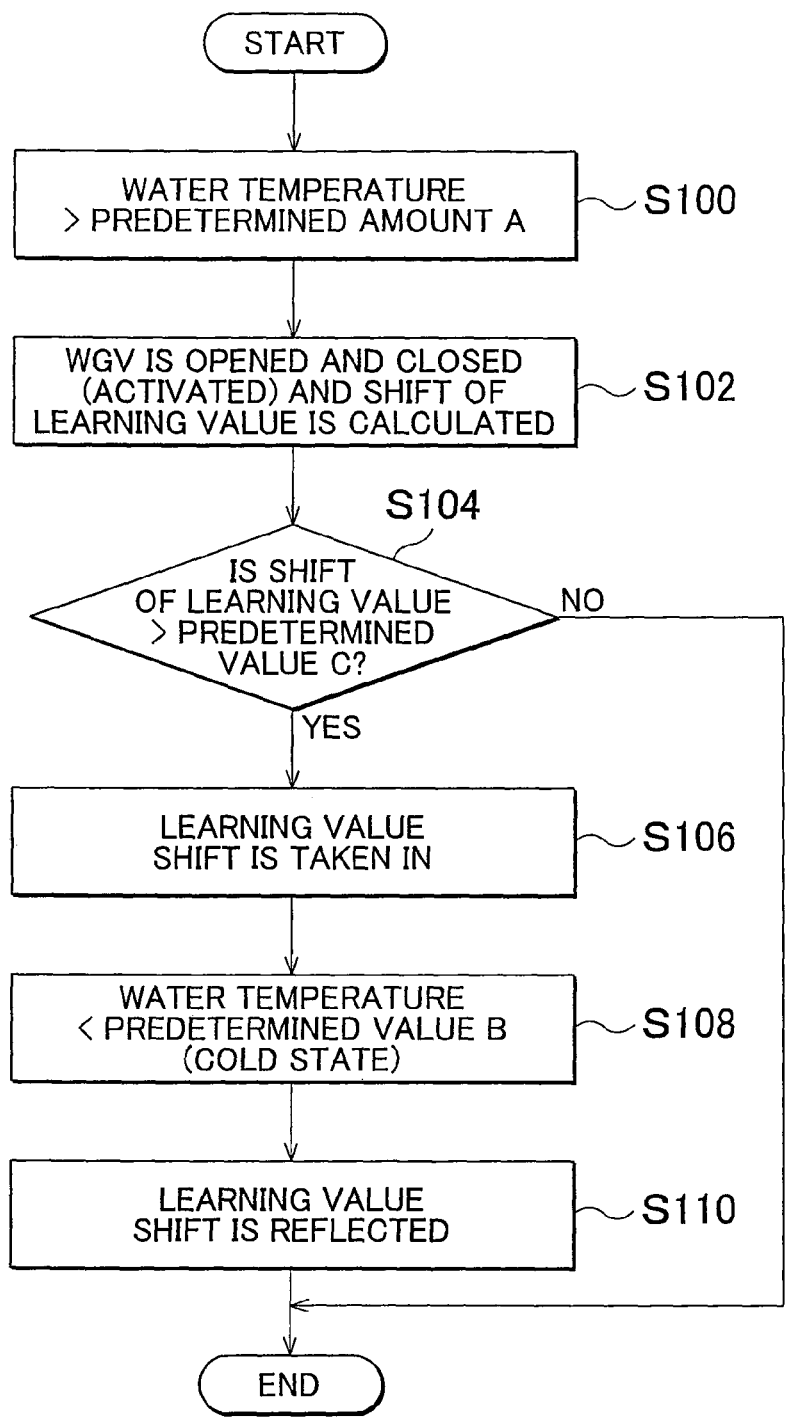
FIG. 5 is a flowchart of the routine executed by an electronic control unit (ECU) in the controller for an internal combustion engine according to Embodiment 1.

FIG. 5 is a flowchart of the routine executed by the ECU 30 in the controller for an internal combustion engine according to Embodiment 1 of the invention. This routine is executed with a predetermined period in the ECU 30.

In the routine shown in FIG. 5, first, the ECU 30 determines whether or not the engine water temperature exceeds a predetermined value A (step S100). In step S100, the ECU 30 compares the engine water temperature detected on the basis of the output value of an engine water temperature sensor (not shown in the figure) with the predetermined value A. The predetermined value A can be set, for example, to 70° C.

Then, the ECU 30 actively opens and closes the wastegate valve 22 and calculates the shift of the learning value amount (step S102). In step S102, the next sub-control processing is executed.

First, step S102*a* is explained. The ECU 30 maintains the wastegate valve 22 in the open state during the operation of the internal combustion engine. The ECU 30 acquires the output of the air-fuel ratio sensor 16 in the open state of the wastegate valve 22.

Then, step S102*b* is explained. The ECU 30 maintains the wastegate valve 22 in the closed state during the operation of the internal combustion engine. The ECU 30 acquires the output of the air-fuel ratio sensor 16 in the closed state of the wastegate valve 22. Actually, at the point of time of step S102, the wastegate valve 22 should be controlled to either of the closed state and the open state during the operation of the internal combustion engine. Therefore, at the point of time in which the processing of step S102 is started, the processing relating to either one of the closed state and the open state of the wastegate valve 22 (in other words, either of the above-described processing of step S102*a* and processing of step S102*b*) has already ended. Therefore, in step S102, the processing that has not ended at the point of time in which the processing of step S102 has started, from among the processing of steps S102*a* and S102*b*, may be performed by the ECU 30. Further, the opening-closing control of the wastegate valve 22 according to the step is an active control, that is an actively performed control.

Finally, step S102*c* will be explained. The learning value in the open state of the wastegate valve 22 and the learning value in the closed state of the wastegate valve 22 are calculated on the basis of the output of the air-fuel ratio sensor 16 acquired in the open and closed states of the wastegate valve 22. The shift amount of the learning values thus calculated is then computed.

Then, the ECU 30 determines whether or not the learning value shift amount calculated in step S102 is larger than the predetermined value C (sep S104). Step S104 makes it possible to determine whether or not the shift of the learning value is so large that it cannot be ignored and to determine whether or not the shift of the learning value should be reflected in air-fuel ratio learning.

The "predetermined value C" in step S104 can be specifically determined in the following manner.

(i) The amount of shift of the air/fuel (A/F) center in A/F ratio control corresponding to the shift amount of the learning value is calculated. More specifically, the relationship between the variation in the A/F center and the variation in learning value may be determined according to the specific computational processing contents (that is, "a formula used for setting the A/F center, which is a computational formula including the air-fuel ratio learning value as a variable thereof") of air-fuel ratio learning which is actually installed in the ECU 30.

(ii) The relationship between the A/F center shift amount and emission increase amount in a cold state is mapped correspondingly to the intake air amount ga and engine revolution speed ne.

(iii) An emission generation amount that cannot be allowed can be set from various restrictions relating to the emission discharge amount.

(iv) The "A/F center shift amount such that the emission generation amount cannot be allowed" can be determined correspondingly to the intake amount ga and engine revolution speed ne according to the abovementioned map, and "the learning value shift amount such that generates such an A/F center shift amount" can be also determined. The "predetermined value C" is set on the basis of the determined learning value shift amount.

When the determination result in step S104 is No (the condition is not fulfilled) as a result of comparative determination using the predetermined value C that has been set in the above-described manner, the present routine ends. This is because it is possible to determine that the learning value shift amount calculated in step S102 is not large enough to be reflected in air-fuel ratio learning.

When the determination result in step S104 is Yes (the condition if fulfilled), the ECU 30 takes in the learning value shift (step S106). In step S106, the ECU 30 takes in the learning value shift amount calculated in step 5102 since it is determined in the abovementioned step S104 that the shift of the learning value should be reflected in air-fuel ratio learning. This "take-in" processing can involve learning of the aforementioned "$H_2$ effect". For example, it is possible to store the value of the shift amount itself, or calculate a predetermined correction coefficient from the shift amount and store this correction coefficient.

Then, the ECU 30 determines whether or not the engine water temperature is below the predetermined value B (step S108). In step S108, the processing is performed to determine whether or not the internal combustion engine is in a cold state. Where the engine is in a cold state, it corresponds to the region in which $H_2$ affects the air-fuel ratio output, and it is possible to conclude that the correction based on the "$H_2$ effect" should be performed. In FIG. 5, steps S100 to S108 are described as a continuous routine within one flowchart, but actually suitable flowcharts are not limited to that shown in the figure. Where there is a time interval after the processing from the abovementioned steps S100 to S106 has ended and before the cold operation period is reached, the routine preceding the take-in processing of the learning value shift amount and the routine perform to reflect the learning value shift during cold operation may be executed independently from each other by the ECU 30.

Then, the ECU 30 reflects the learning value shift in the air-fuel ratio learning value (step S110). In step S110, the air-fuel ratio control using the air-fuel ratio learning value is performed after the learning value shift amount has been included during the operation (running) in the open state of the wastegate valve 22 in a cold state of the engine, or the air-fuel ratio control using the air-fuel ratio learning value is performed after the learning value shift amount has been included during the operation (running) in the closed state of the wastegate valve 22 in a cold state of the engine. The present routine is thereafter ended.

With the specific processing according to the above-described Embodiment 1, by taking into account the occurrence of a learning value shift amount between the open state and the closed state of the wastegate valve 22, it is possible to inhibit the decrease in accuracy of air-fuel ratio learning when output signal of the air-fuel ratio sensor 16 is used for air-fuel ratio learning and inhibit the degradation of emission in air-fuel ratio control using the air-fuel ratio learning results. In particular, by learning the difference in learning value between the open state and closed state of the wastegate valve 22 as a learning value of "$H_2$ effect", it is possible to perform the correction based on this "$H_2$ effect" in the cold operation period which is a region in which $H_2$ affects the air-fuel ratio output. As a result, the air-fuel ratio control can be performed more accurately and emission decrease can be ensured.

The invention is not limited to the abovementioned routine. Thus, it is not necessary to handle the learning value shift amount as the $H_2$ effect, and the learning value shift amount may be reflected in air-fuel ratio learning as necessary, that is, not in the form of taking the $H_2$ effect into account only in the cold state.

A controller for an internal combustion engine according to Embodiment 2 of the invention has hardware configuration similar to that of Embodiment 1 shown in FIG. 1, and the description thereof will be hereinbelow omitted or simplified to avoid redundant explanation. Control operations of various kinds (software configuration) such as air-fuel ratio learning in the controller for an internal combustion engine according to Embodiment 2 are also similar to those in Embodiment 1. In Embodiment 2, the reflection of the learning value shift amount in air-fuel ratio learning according to Embodiment 1 can be performed, while inhibiting a torque shock by adding the following control corresponding to intake air amount.

Figure 6:
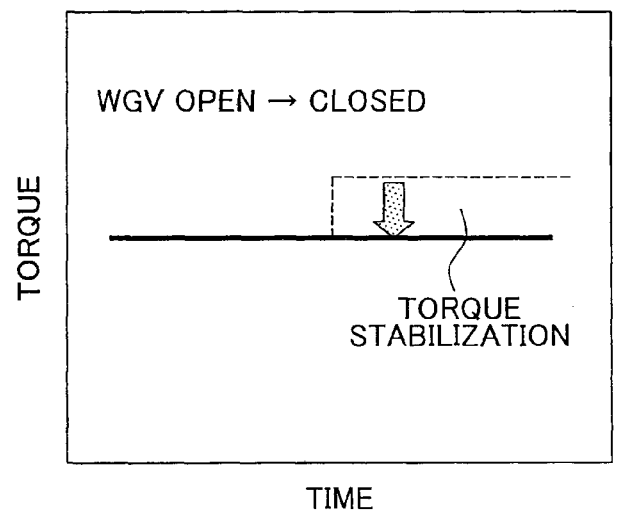
FIG. 6 illustrates the operation of the controller for an internal combustion engine according to Embodiment 2.
Figure 7:
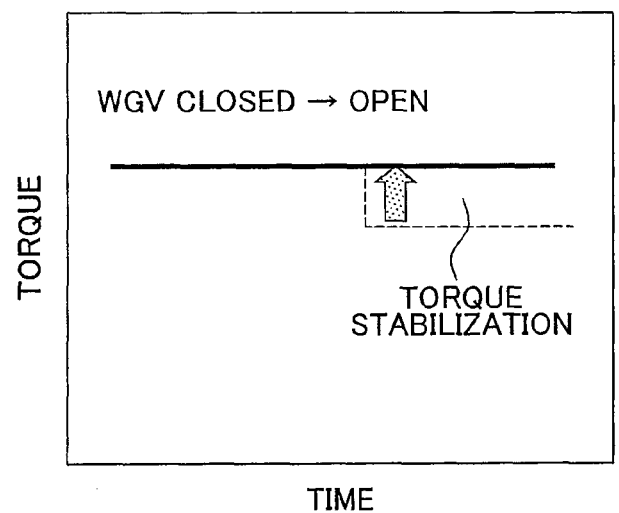
FIG. 7 illustrates the operation of the controller for an internal combustion engine according to Embodiment 2.

FIGS. 6 and 7 illustrate the operation of the controller for an internal combustion engine according to Embodiment 2. When the intake air amount in the engine body 10 is small enough so that that the torque shock caused by opening and closing of the wastegate valve 22 can be ignored, the control according to Embodiment 1 (control routine shown in FIG. 5) can be executed. Meanwhile, when the torque shock caused by opening and closing of the wastegate valve 22 cannot be ignored, either of the below-described measures (2-1) and (2-2) can be used to inhibit the torque shock.

(2-1) When the wastegate valve 22 is caused to make a transition from the open state to the closed state, a torque shock occurs due to the increase in torque (see broken line in FIG. 6). Therefore, the torque is controlled to a constant value to inhibit such torque shock. More specifically, the fuel injection amount is corrected so as to inhibit torque fluctuations, or the increase in torque is inhibited by performing a control to delay the ignition timing, decrease the engine revolution speed, and decrease the opening degree of the throttle (see the arrow in FIG. 6).

(2-2) When the wastegate valve 22 is caused to make a transition from the closed state to the open state, a torque shock occurs due to the decrease in torque (see broken line in FIG. 7). Therefore, the torque is controlled to a constant value to inhibit such torque shock. More specifically, the fuel injection amount is corrected so as to inhibit torque fluctuations, or the decrease in torque is inhibited by performing a control to increase the engine revolution speed and increase the opening degree of the throttle (see the arrow in FIG. 7).

Figure 8:
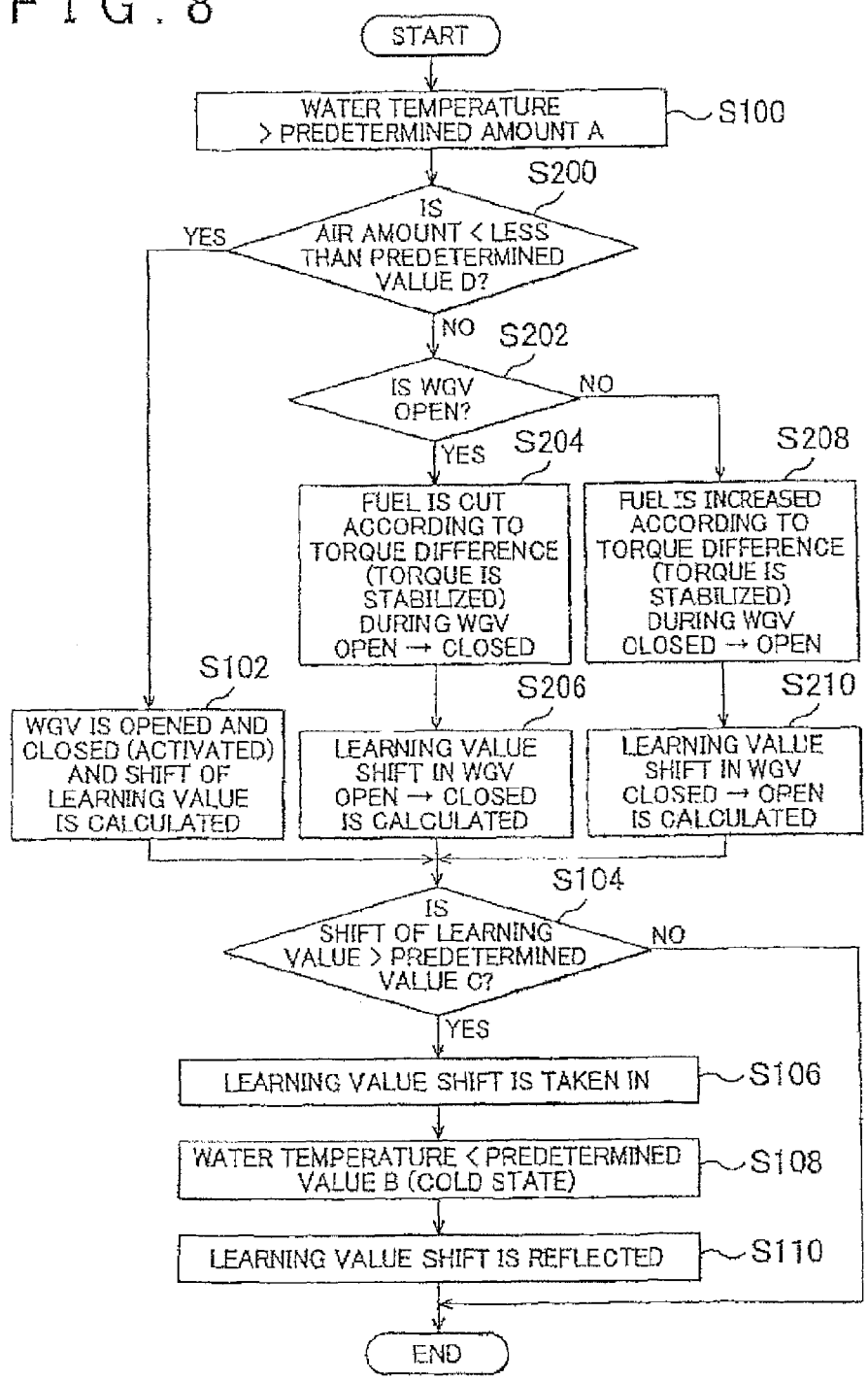
FIG. 8 is a flowchart of the routine executed by the ECU in the controller for an internal combustion engine according to Embodiment 2.

FIG. 8 is a flowchart of the routine executed by the ECU 30 in the controller for an internal combustion engine according to Embodiment 2. This routine can be executed in the ECU 30 with a predetermined period.

In the routine shown in FIG. 8, first, the ECU 30 executes the processing of step S100, in the same manner as in the routine shown in FIG. 5 and relating to Embodiment 1.

Then, the ECU 30 determines whether or not the value of the intake air amount is less than a predetermined value D (step S200). When the condition of step S200 is fulfilled, the ECU 30 executes the processing of steps S102, S104, S106, S108, and S110 in the same manner as in the routine shown in FIG. 5 and relating to Embodiment 1.

When the condition of step S200 is not fulfilled, that is, when the value of the intake air amount is equal to or greater than the predetermined value D, the ECU 30 then determines whether or not the wastegate valve 22 (shown as "WGV" in the FIGS.) is presently in the open state (step S202).

Where the determination result of step S202 is positive (Yes), the ECU 30 causes a transition of the wastegate valve 22 from the open state to the closed state and corrects the fuel injection amount so as to cut the amount of fuel according to the torque variation corresponding to such transition (step S204). As a result, a torque stabilization operation according to the aforementioned measure (2-1) can be realized.

Then, the ECU 30 calculates the learning value shift amount corresponding to the transition of the wastegate valve 22 from the open state to the closed state (step S206). In step S206, the ECU 30 executes the computational processing similar to the computation of the learning value shift amount in step S102. Then, the ECU 30 executes the processing of steps S104, S106, S108, and S110 in the same manner as in the routine shown in FIG. 5 and relating to Embodiment 1. The present routine is thereafter ended.

Where the determination result of step S202 is negative (No), the ECU 30 causes a transition of the wastegate valve 22 from the closed state to the open state and corrects the fuel injection amount so as to increase the amount of fuel according to the torque variation corresponding to such transition (step S208). As a result, a torque stabilization operation according to the aforementioned measure (b 2-2) can be realized.

Then, the ECU 30 calculates the learning value shift amount corresponding to the transition of the wastegate valve 22 from the closed state to the open state (step S210). Then, the ECU 30 executes the processing of steps S104, S106, S108, and S110 in the same manner as in the routine shown in FIG. 5 and relating to Embodiment 1. The present routine is thereafter ended.

According to the above-described processing, the learning value shift amount can be reflected in air-fuel ratio learning, while inhibiting the torque shock.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:

1. A vehicle comprising:
an internal combustion engine having an exhaust passage;
a supercharger provided in the internal combustion engine and having a wastegate valve and a turbine;
an air-fuel ratio sensor provided downstream of the turbine of the supercharger in the exhaust passage of the internal combustion engine; and
an electronic control unit configured to control the internal combustion engine, the electronic control unit includes control logic, which when executed:
determines a first learning value in an open state of the wastegate valve by performing air-fuel ratio learning in the internal combustion engine on the basis of an output of the air-fuel ratio sensor,
determines a second learning value in an closed state of the wastegate valve by performing air-fuel ratio learning in the internal combustion engine on the basis of an output of the air-fuel ratio sensor, and
executes an air-fuel ratio control of the internal combustion engine based on a difference between the first learning value in the open state of the wastegate valve and the second learning value in the closed state of the wastegate valve.

2. The vehicle according to claim 1, wherein the electronic control unit:
controls the wastegate valve so as to change one of the open state of the wastegate valve and the closed state of the wastegate valve to the other one of the open state or closed state during operation of the internal combustion engine;
acquires the output of the air-fuel ratio sensor before and after the control performed on the wastegate valve; and
calculates, based on the acquired output of the air-fuel ratio sensor before and after the control performed on the wastegate valve, a difference between the first learning value calculated in the open state of the wastegate valve and the second learning value calculated in the closed state of the wastegate valve.

3. The vehicle according to claim 1, wherein the electronic control unit controls the wastegate valve to one of the closed state and the open state during a cold operation of the internal combustion engine,
wherein when the wastegate valve has been controlled to one of the closed state and the open state during the cold operation, the electronic control unit uses a corrected learning value, which is a value obtained by including the other of the first learning value or the second learning value in the one of the first learning value or the second learning value, in order to control the internal combustion engine during the cold operation.

4. The vehicle according to claim 3, where the electronic control unit uses the corrected learning value to control the internal combustion engine during the cold operation only when a value of the difference between the first learning value in the open state of the wastegate valve and the second learning value in the closed state of the wastegate valve is larger than a predetermined value.

5. The vehicle according to claim 3, wherein a period of cold operation is when a temperature of cooling water that cools the internal combustion engine is equal to or lower than a predetermined temperature.

6. The vehicle according to claim 3, wherein the electronic control unit calculates the first learning value and the second learning value by including an effect produced by hydrogen on an output of the air-fuel ratio sensor during the cold operation.

7. The vehicle according to claim 1, wherein the electronic control unit corrects a fuel injection amount in the internal combustion engine so as to inhibit torque fluctuations in the internal combustion engine caused by a switching control when the switching control is performed to switch the wastegate valve between the open state and closed state.

8. The vehicle according to claim 7, wherein the electronic control unit corrects a fuel injection amount in the internal combustion engine so as to inhibit torque fluctuations in the internal combustion engine caused by the switching control only when a value of an intake air amount in the internal combustion engine is equal to or greater than a predetermined value.

9. The vehicle according to claim 7, wherein when the wastegate valve is presently in the open state, the electronic control unit performs control from the open state to the closed state of the wastegate valve and corrects a fuel injection amount to cut the fuel according to a torque difference corresponding to the control from the open state to the closed state.

10. The vehicle according to claim 7, wherein when the wastegate valve is presently in the closed state, the electronic control unit performs control from the closed state to the open state of the wastegate valve and corrects the fuel injection amount to increase the amount of fuel according to the torque difference corresponding to the control from the closed state to the open state.

11. A control method for a vehicle that includes an internal combustion engine having an exhaust passage; a supercharger provided in the internal combustion engine and having a wastegate valve and a turbine; and an air-fuel ratio sensor provided downstream of the turbine of the supercharger in the exhaust passage of the internal combustion engine, the control method comprising:
determining via an electronic control unit a first learning value in an open state of the wastegate valve by performing air-fuel ratio learning in the internal combustion engine on the basis of an output of the air-fuel ratio sensor,
determining via the electronic control unit a second learning value in an closed state of the wastegate valve by performing air-fuel ratio learning in the internal combustion engine on the basis of an output of the air-fuel ratio sensor, and
executing an air-fuel ratio control with the internal combustion engine, which is controlled by the electronic control unit, based on a difference between the first learning value in the open state of the wastegate valve and the second learning value in the closed state of the wastegate valve.

* * * * *